United States Patent [19]

Senftleben et al.

[11] Patent Number: 5,797,817
[45] Date of Patent: Aug. 25, 1998

[54] HYDRAULIC TENSIONER WITH INTERNAL RESERVOIR

[75] Inventors: Christopher T. Senftleben, Dryden; Curt A. Wykstra, Moravia, both of N.Y.

[73] Assignee: Borg-Warner Automotive, Inc., Sterling Heights, Mich.

[21] Appl. No.: 573,181

[22] Filed: Dec. 15, 1995

[51] Int. Cl.$^6$ ............................................. F16H 7/08
[52] U.S. Cl. .................................. 474/110; 474/138
[58] Field of Search ................................ 474/110, 135, 474/138; 137/316, 543.17, 39

[56] References Cited

U.S. PATENT DOCUMENTS

| | | | |
|---|---|---|---|
| 3,791,406 | 2/1974 | Phillips | 137/543.17 |
| 4,049,017 | 9/1977 | Jones | 137/543.17 |
| 4,283,182 | 8/1981 | Kraft | 474/110 |
| 4,674,996 | 6/1987 | Anno et al. | |
| 4,695,268 | 9/1987 | Kodama et al. | |
| 4,708,696 | 11/1987 | Kimura et al. | |
| 4,790,796 | 12/1988 | Okabe et al. | |
| 4,834,694 | 5/1989 | Martin | 474/135 |
| 4,894,047 | 1/1990 | Breon et al. | |
| 4,909,777 | 3/1990 | Inoue et al. | |
| 4,911,679 | 3/1990 | Inoue et al. | |
| 4,940,447 | 7/1990 | Kawashima et al. | |
| 4,950,209 | 8/1990 | Kawashima et al. | |
| 4,963,121 | 10/1990 | Himura et al. | |
| 4,985,009 | 1/1991 | Schmidt et al. | |
| 4,997,410 | 3/1991 | Polster et al. | |
| 5,030,169 | 7/1991 | Kiso et al. | |
| 5,087,225 | 2/1992 | Futami et al. | |
| 5,088,966 | 2/1992 | Suzuki et al. | |
| 5,090,946 | 2/1992 | Futami et al. | |
| 5,116,284 | 5/1992 | Cho | 474/110 |
| 5,248,282 | 9/1993 | Suzuki | |
| 5,259,820 | 11/1993 | Mott | 474/110 |
| 5,277,664 | 1/1994 | Mott | 474/110 |
| 5,346,436 | 9/1994 | Hunter et al. | |
| 5,352,159 | 10/1994 | Suzuki et al. | |
| 5,577,970 | 11/1996 | Smith et al. | 474/110 |

*Primary Examiner*—Roger J. Schoeppel
*Attorney, Agent, or Firm*—Hugh A. Abrams, Esq.; Greg Dziegielewski, Esq.

[57] ABSTRACT

A hydraulic tensioner with an internal reservoir. The tensioner includes a housing having a sleeve, and a hollow piston slidably received about the sleeve and biased in a protruding direction by a spring. A fluid chamber is defined by the sleeve and the hollow piston. Fluid from an external source flows through a passageway into a reservoir which is located inside the tensioner housing above the fluid chamber. The reservoir is connected to the fluid chamber such that fluid flows from the reservoir through a check valve assembly into the fluid chamber such that the fluid chamber remains filled with fluid.

17 Claims, 7 Drawing Sheets

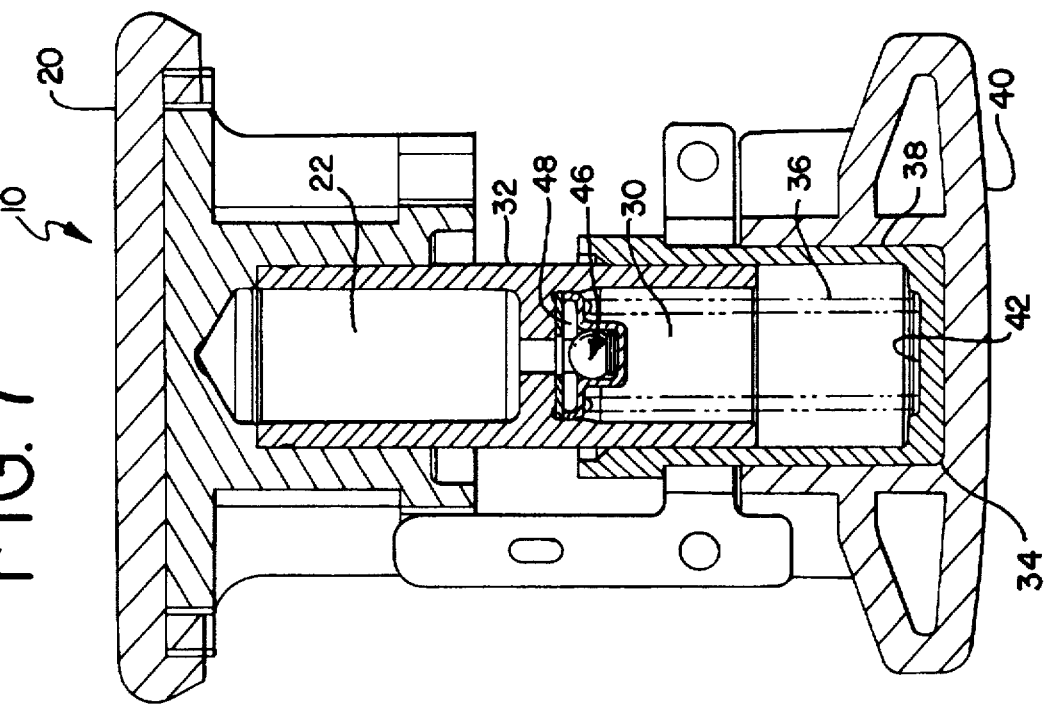
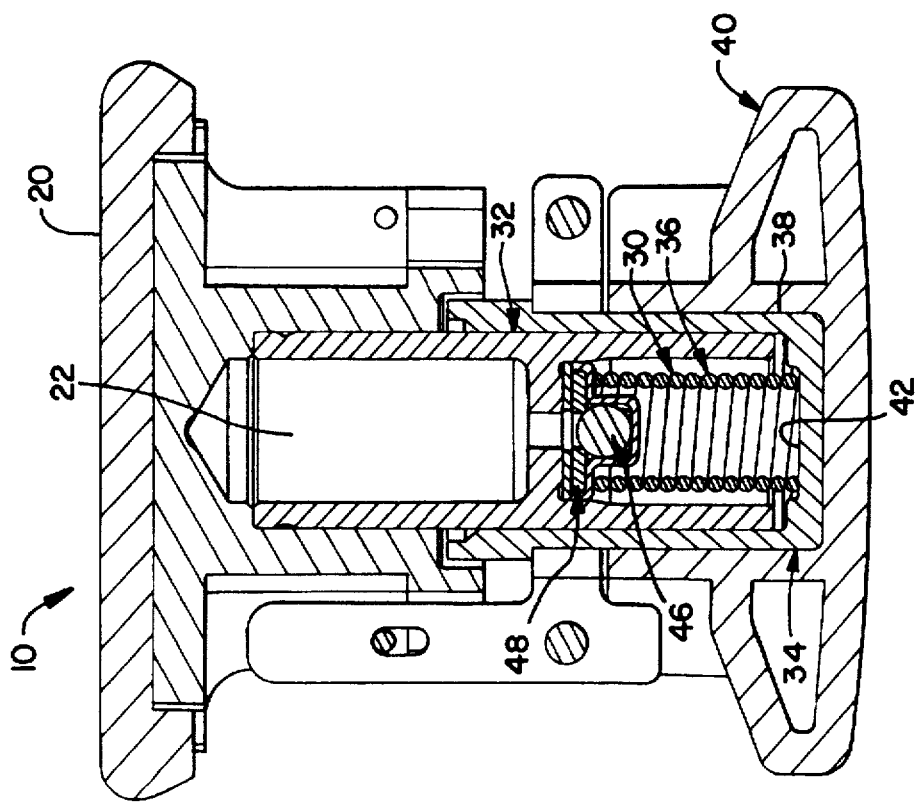

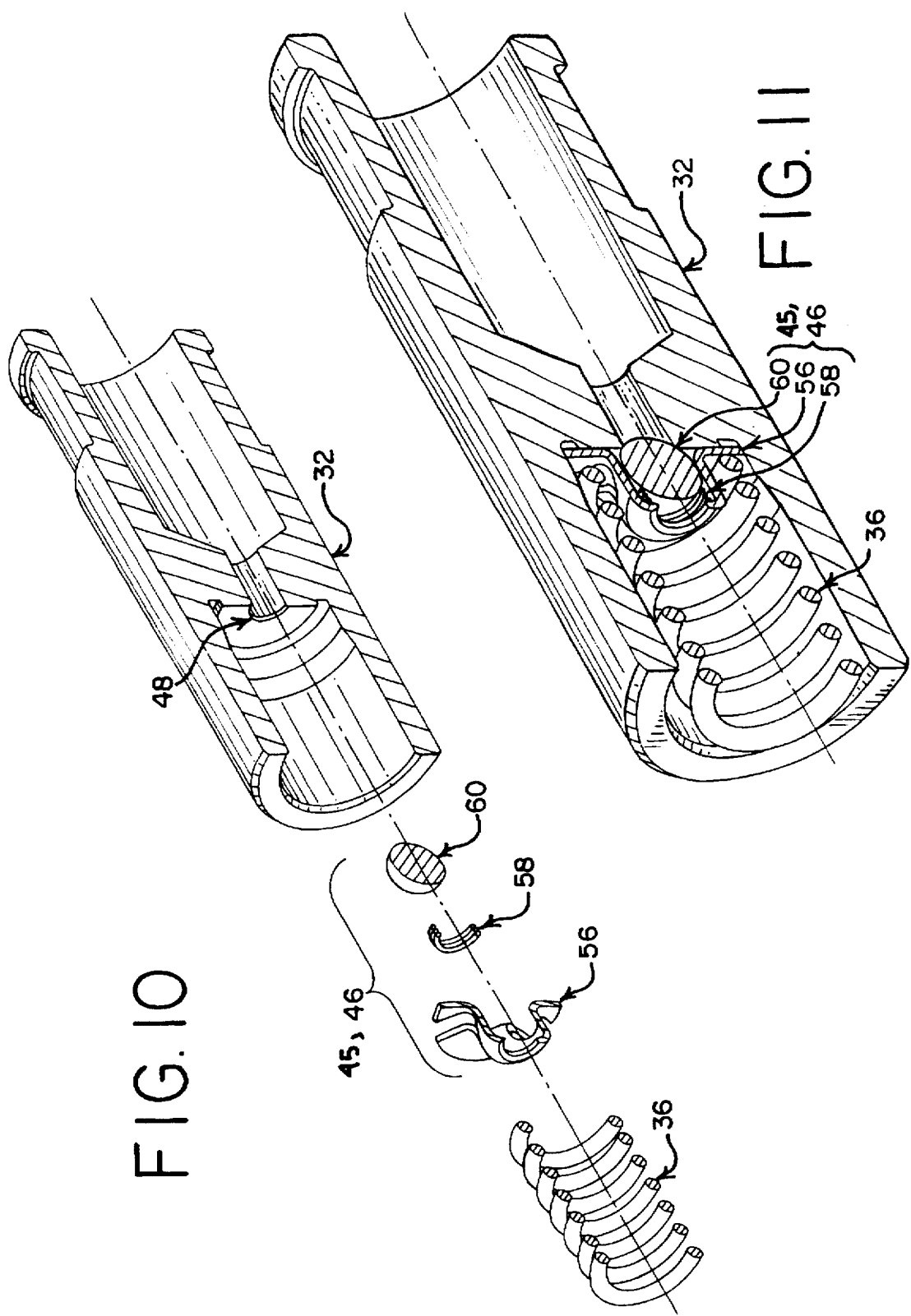

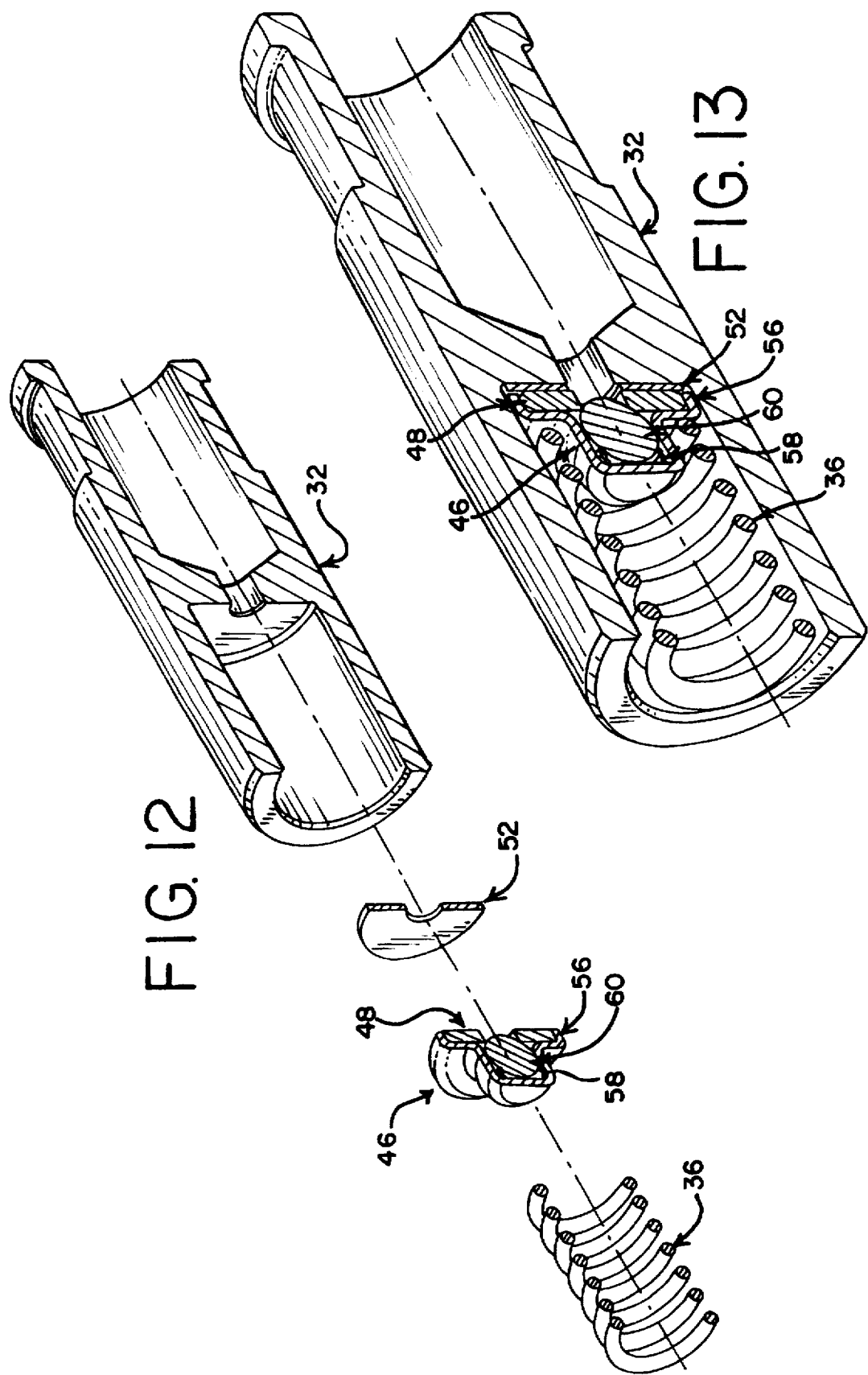

HYDRAULIC TENSIONER WITH INTERNAL RESERVOIR

BACKGROUND OF THE INVENTION

The present invention relates to a hydraulic tensioner having a housing which includes a sleeve, a hollow piston which is slidably received about the sleeve and a fluid chamber which is defined by the sleeve and the piston. More particularly, the present invention relates to such a tensioner with a fluid reservoir located in a cavity created by the housing and a sleeve fixed into the housing.

Tensioning devices, such as hydraulic tensioners, are used as a control device for automotive timing drives. An automotive timing drive includes either a chain or belt which travels between a plurality of sprockets or pulleys. In an automotive application, the tension of the chain can vary greatly on the slack side of the chain as the chain travels between the sprockets. Likewise, the tension of the chain can further vary as the chain stretches due to wear. As a result, it is important to impart and maintain a certain degree of tension to the chain to maintain control over the chain as it travels between the sprockets. As the chain tension lessens due to wear, it is important to provide an adjustable tensioning member to maintain the proper tension of the chain.

Hydraulic tensioners are well known in the art such as Hunter et al., U.S. Pat. No. 5,346,436, which is owned by the assignee of the present application. Hunter et al. disclose a hydraulic tensioner with an air vent. The present invention relates to a hydraulic tensioner with an internal fluid reservoir that, in locating the reservoir directly adjacent to the fluid chamber, provides for the fluid chamber to remain filled with fluid.

One example of a hydraulic tensioner with an internal reservoir is described in Suzuki et al., U.S. Pat. No. 5,352,159. Suzuki et al. disclose an oil reservoir which is formed as an integral part of the tensioner housing. The housing also defines a cylindrical internal oil chamber. A piston, which is located within the oil chamber, divides the oil chamber into a low pressure chamber and a high pressure chamber. The internal reservoir has a passage in communication with a low pressure chamber and an opening for collecting oil from the oil splash within the engine and surrounding the tensioner. Oil for the tensioner is replenished from the oil splash. The low pressure chamber and the high pressure chamber are connected at two locations. A check valve in the second oil passage restricts flow into the high pressure chamber while preventing flow out of the high pressure chamber.

Another example of a hydraulic tensioner with an internal reservoir is described in Futami et al., U.S. Pat. No. 5,090,946. Futami et al. disclose a tensioner with a built-in oil reservoir. Oil flows from the reservoir through a check valve into a fluid chamber formed by a bore and piston. Oil then flows back from the fluid chamber through a separate orifice to the reservoir.

Another example of a hydraulic tensioner with an internal reservoir is described in Suzuki, U.S. Pat. No. 5,248,282. Suzuki discloses a tensioner with an oil reservoir which is formed inside the plunger.

Another example of a hydraulic tensioner with an internal reservoir is described in Polster et al., U.S. Pat. No. 4,997,410. Polster et al. disclose an internal reservoir which is separated from a pressure chamber by a check valve and which surrounds a cylinder.

The tensioner of the present invention uses two pressure chambers. One is a low pressure chamber that forms an internal reservoir by being supplied with pressurized engine during operation. The second chamber is a high pressure chamber, which is connected to the reservoir by a check valve that prevents fluid flow back into the internal reservoir. Additionally, the tensioner of the present invention provides an internal reservoir, but such a reservoir is not formed inside the piston nor does it surround a cylinder. In the present invention, the internal reservoir is connected to a single fluid chamber. A check valve positioned between the internal reservoir and the fluid chamber prevents reverse fluid flow into the reservoir. Additionally, the internal reservoir is preferably positioned directly above the check valve, fluid chamber, piston and cylinder or sleeve.

The internal reservoir of the present invention provides several advantages. The manufacture of the internal reservoir into the tensioner housing, in conjunction with its location above the fluid chamber and check valve, allows the use of gravitational forces to maintain the fluid chamber filled with fluid. Moreover, fluid cannot "leak" out of the chamber unless it rises up, between the piston and sleeve. Before operation of the automotive timing drive, when pressurized fluid has not yet filled the chamber, fluid is maintained in the chamber from the location of the reservoir over the chamber. Manufacturing of the tensioner is simplified because tolerances between the sleeve and piston are much more easily maintained than the tolerances between piston and bore in a conventional tensioner. Because the sleeve may be fixed into the housing by press fit, by threaded screw, by insert molding or by any other mechanical means, manufacturing is simplified by avoiding the need to maintain precise tolerances between the sleeve and the bore in the housing.

SUMMARY OF THE INVENTION

The present invention is directed to a hydraulic tensioner having an internal reservoir. The tensioner includes a housing having a hollow sleeve, and a hollow piston slidably received about the outside diameter of the sleeve and biased in a protruding direction from the housing by a spring. The sleeve is fixed into the housing during manufacture. The sleeve may be fixed into the housing by press fit, by insert molding, by screw means, or by any other mechanical means. A fluid chamber is defined by the sleeve and the piston. An internal reservoir is located within the housing above the fluid chamber and is connected to an external oil source. The reservoir is also connected to the fluid chamber. The reservoir, in addition, has an air bleed outlet to allow air and fluid to exit the reservoir into the atmosphere.

A check valve is positioned in the passage between the internal reservoir and the fluid chamber. The check valve permits fluid flow into the chamber from the internal reservoir while blocking flow in the reverse direction, i.e., back into the internal reservoir. The check valve may be a ball and spring check valve, a spring valve, or a variable orifice check valve. In a preferred embodiment, the check valve is surrounded or seats within a seat portion, also known as the check valve seat. In this preferred embodiment, the check valve seat is press fit into the sleeve such that the seat is then immoveable, or the check valve seat is integral to the sleeve itself. In another preferred embodiment, the check valve seat is positioned inside a check valve assembly, which is held in place by the spring and sealed with a gasket to the sleeve.

The piston of a hydraulic tensioner contacts the face of the tensioner which contacts the chain or belt of the automotive timing device. The piston, and therefore the tensioner face, must be able to extend outward as the chain moves and stretches with the increased loads from higher engine speeds. The piston and face are forced outward by the force of fluid pressure and the spring against the bottom of the piston. The piston is forced inward by the force of the chain against the tensioner face at the bottom of the piston. The distance of outward travel of the piston is dependent on the balance of the hydraulic and spring forces outward against the chain force inward.

During manufacturing and assembly, a retainer which is assembled around the tensioner face, rotationally locates the tensioner face with respect to the housing. A pin, installed around the housing and through the retainer, prevents the tensioner from extending or protruding during shipping and installation. After the tensioner is installed as part of the automotive timing system, the pin is removed from the retainer to allow the tensioner to function properly. The retainer prevents the tensioner face from rotating during shipping and installation, and during operation of the automotive timing system.

BRIEF DESCRIPTION OF THE DRAWINGS

FIG. 6 is a sectional view of a hydraulic tensioner of FIG. 4 along the line VI—VI;

FIG. 7 is a sectional view of a hydraulic tensioner of FIG. 4 along the line VI—VI illustrating the piston at its maximum extension;

FIG. 10 is an exploded view of one embodiment illustrating the placement of the check valve within the sleeve before assembly;

FIG. 11 is a view of the embodiment of FIG. 10 illustrating the placement of the check valve within the sleeve after assembly;

FIG. 12 is an exploded view of another embodiment illustrating the placement of the check valve within the sleeve before assembly; and FIG. 13 is a view of the embodiment of FIG. 12 illustrating the placement of the check valve within the sleeve after assembly.

DETAILED DESCRIPTION OF THE PRESENTLY PREFERRED EMBODIMENTS

Figure 1:
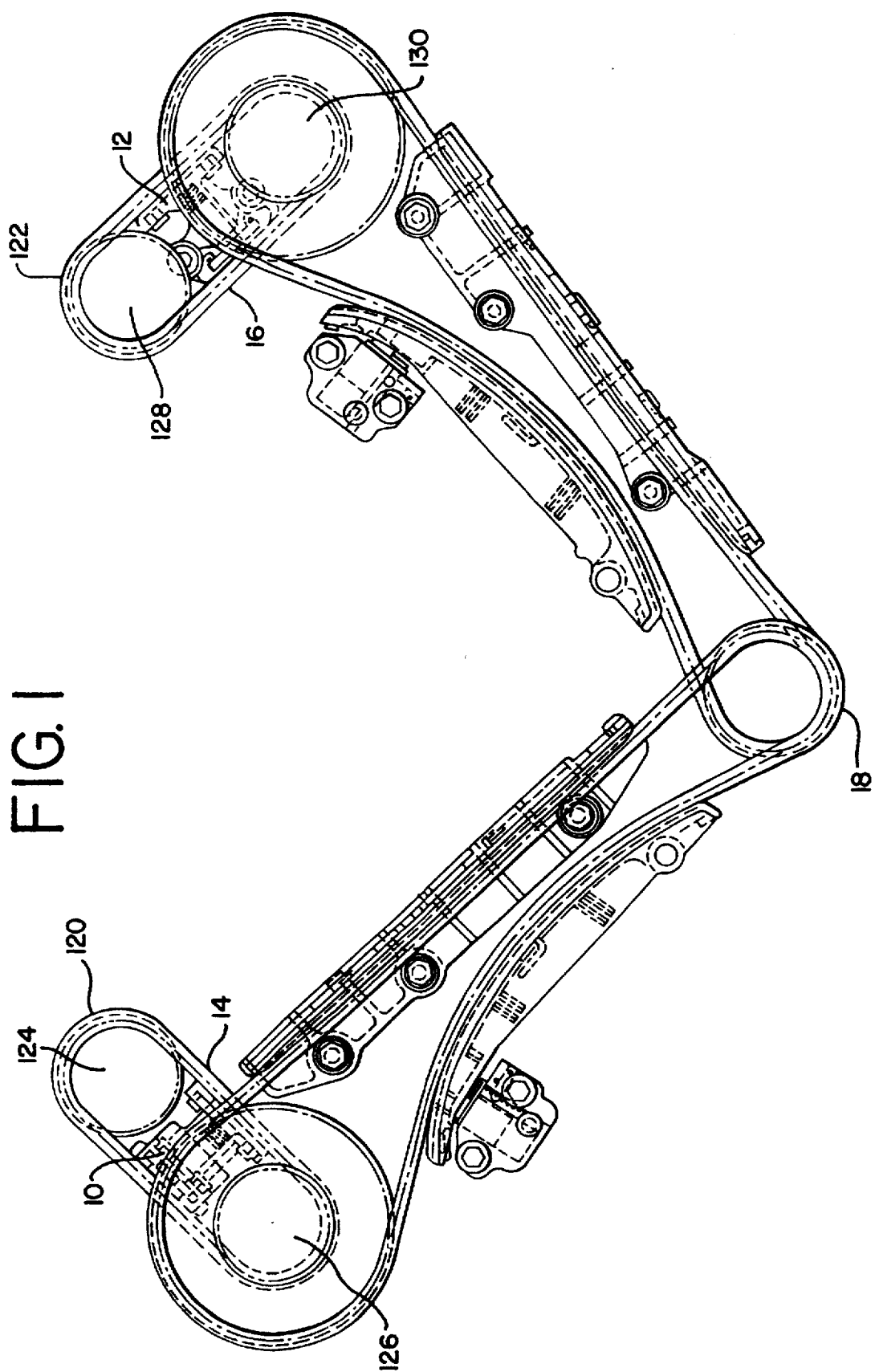
FIG. 1 is a schematic illustrating a timing chain or belt system with dual overhead camshafts and a camshaft-to-camshaft drive system.

Turning now to the drawings, FIG. 1 illustrates two hydraulic tensioners 10, 12 positioned in opposite orientations in a timing chain or belt system with dual overhead camshafts 14, 16 and a camshaft to camshaft drive system driven by crankshaft 18. Chains 120, 122 are wrapped about sprockets 124, 126, 128 and 130 of the camshafts and the tensioners 10, 12 are provided to maintain chain tension in the cam-to-cam drive chain.

Figure 2:
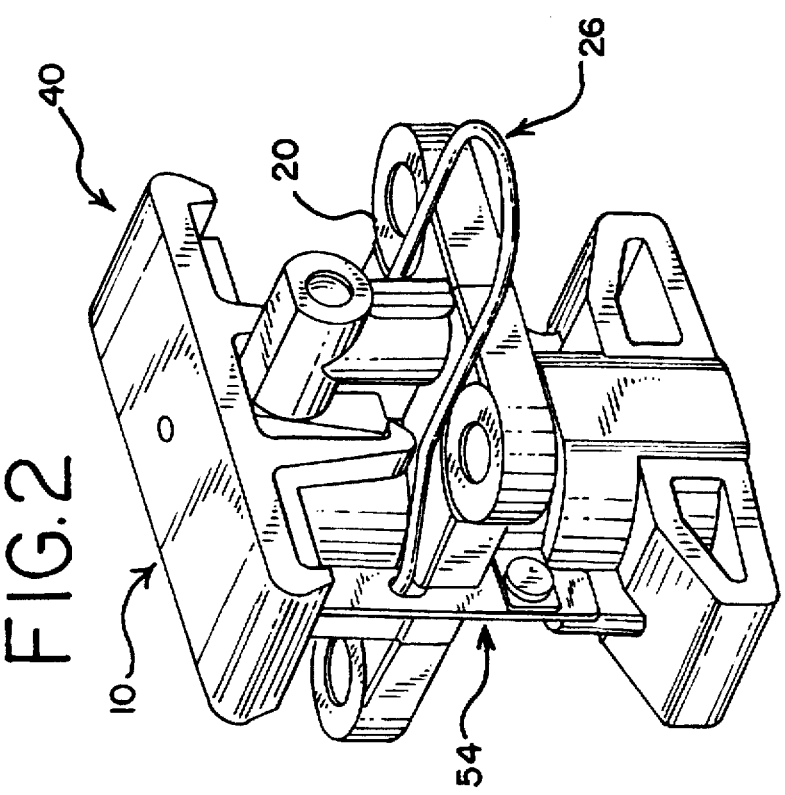
FIG. 2 is a schematic illustrating a hydraulic tensioner incorporating the internal reservoir of the present invention.
Figure 5:
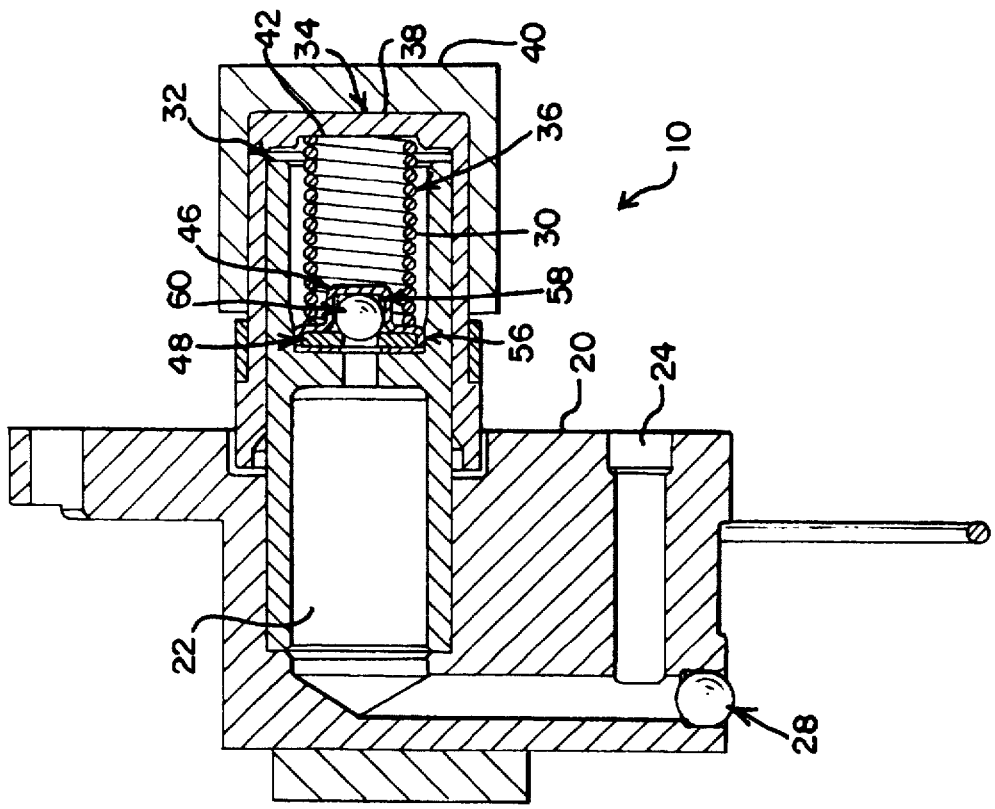
FIG. 5 is a sectional side view of a hydraulic tensioner incorporating an internal reservoir of the present invention.

FIG. 2 illustrates a hydraulic tensioner 10 (or 12) of FIG. 1. Referring more particularly to FIG. 5, a sectional side view of the present invention is shown. The tensioner 10 includes a housing 20 having an internal reservoir 22. The internal reservoir is formed in a bore 21 that is formed integrally in the housing. Fluid enters the internal reservoir 22 from a pressure fluid source through a passageway 24 which connects the internal reservoir 22 to the pressure fluid source. The fluid source may be an oil pump or oil reservoir within the engine block or the like. The passageway 24 is formed by boring into the housing 20 in two directions which are perpendicular to each other and then using a plug or ball 28 to block one of the passageways.

Figure 4:
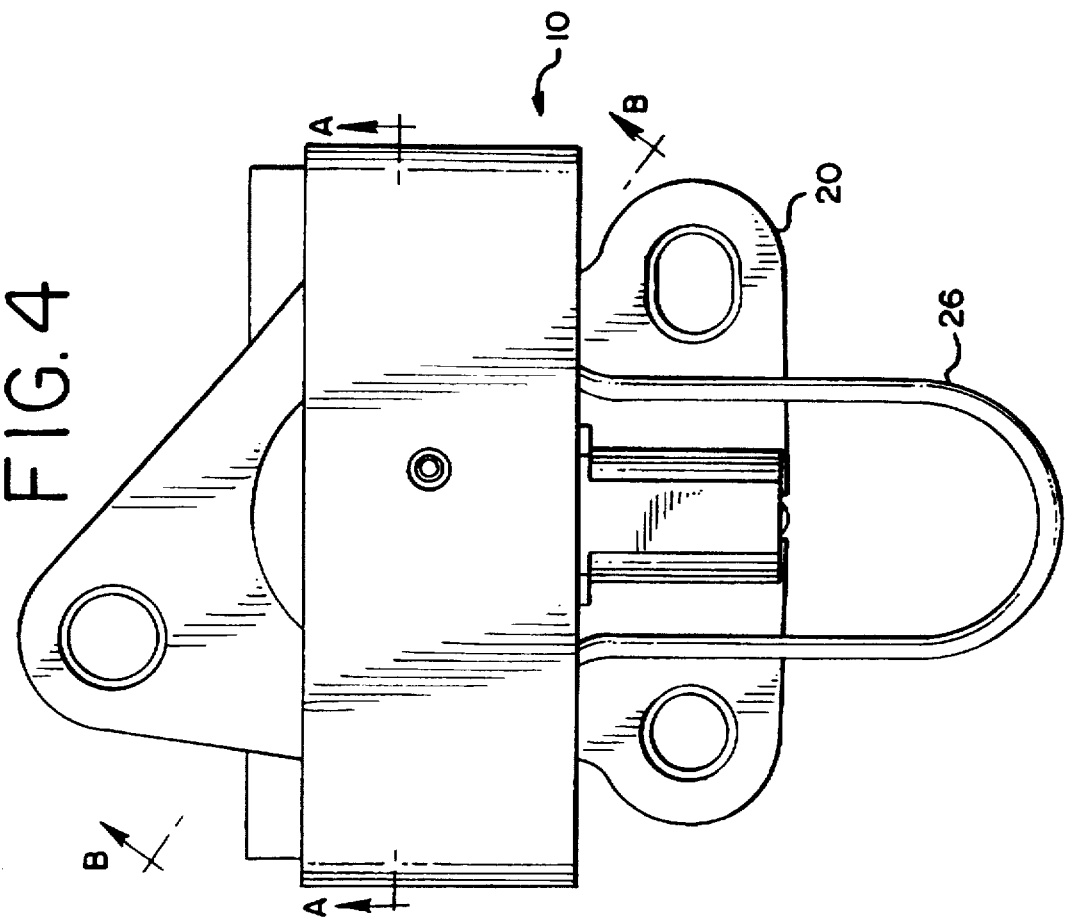
FIG. 4 is a top view of a hydraulic tensioner incorporating an internal reservoir of the present invention.
Figure 8:
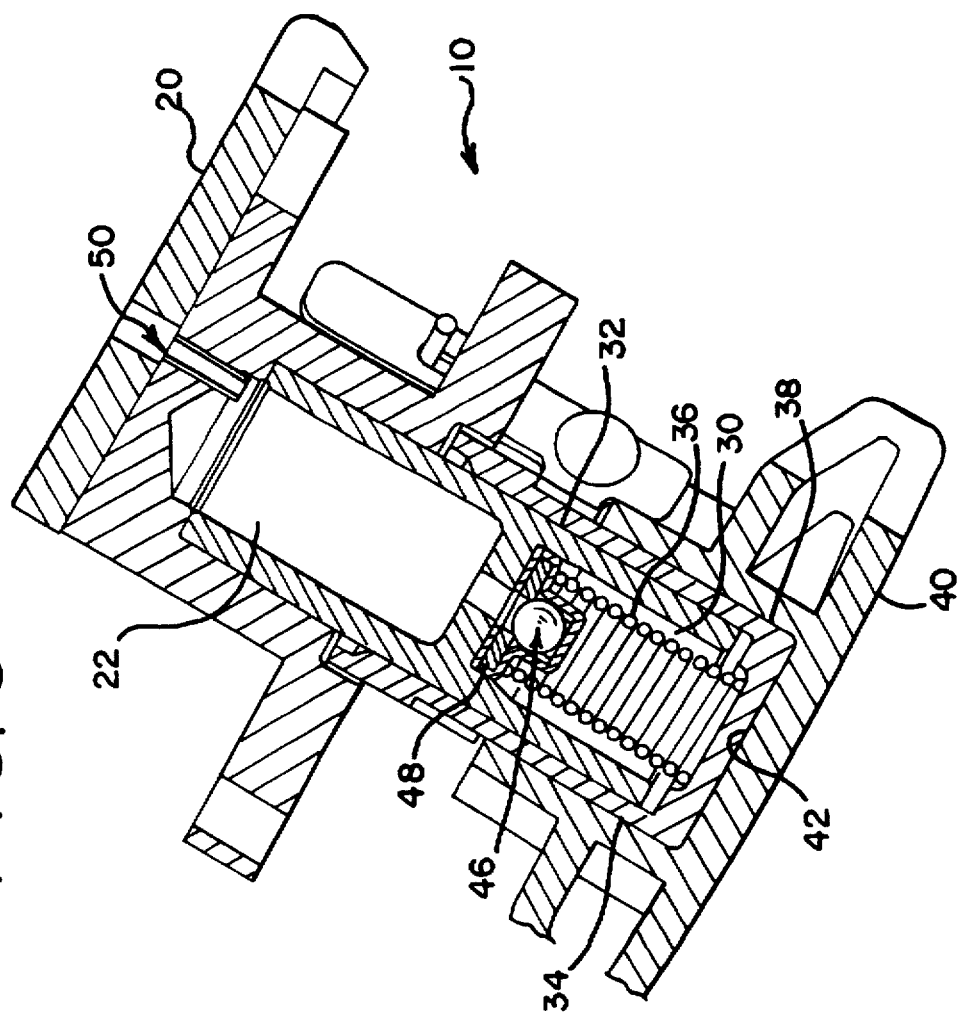
FIG. 8 is a sectional view of a hydraulic tensioner of FIG. 4 along the line VIII—VIII.

FIG. 4 illustrates a top view of a hydraulic tensioner 10 of FIG. 1. Referring more particularly to FIGS. 6, 7 and 8, sectional views of one embodiment of the present invention are shown. Fluid from the internal reservoir 22 enters the fluid chamber 30 formed by the sleeve 32 and hollow piston 34, as described below. In one embodiment, the sleeve 32 is press fit into the housing 20. The sleeve 32 is press fit, or otherwise inserted into, bore 21 that is formed in the housing. The opening in the sleeve and the bore form the internal reservoir. In another embodiment, the sleeve 32 is assembled into the housing 20 by screw means. The sleeve may be assembled into the housing 20 by insert molding or any other mechanical means of fixing the sleeve into the housing 20. The hollow piston 34 is slidably received about the diameter of the sleeve 32 and biased in a protruding direction by a spring 36. The lower end 38 of the piston 34 is integral with the tensioner face 40. The tensioner face 40 provides tension along the chain/belt (not shown). A spring 36 contacts the inside 42 of the lower end 38 of the piston 34 to bias the piston 34 in a protruding or outward direction.

A check valve 45 is provided between the fluid chamber 30 and the internal reservoir 22. FIGS. 10, 11, 12 and 13 illustrate methods for positioning a check valve 45 into the tensioner 10. In one embodiment, the check valve 45 consists of a check valve assembly 46 that seats within or is surrounded by a seat portion, also known as a check valve seat 48. FIGS. 10 and 11 illustrate an embodiment in which a check valve seat 48 is formed integrally with the sleeve 32. In this embodiment, a check valve retainer 56, a check valve spring 58, and a check valve ball 60 all comprise the check valve assembly 46. The check valve assembly 46 seats on the check valve seat 48, which is integral to the sleeve 32. In another embodiment, the check valve seat 48 is press fit within the sleeve 32 and then the check valve assembly 46 seats on or is surrounded by the check valve seat 48. FIGS. 12 and 13 illustrate another embodiment in which the check valve seat 48 is first positioned inside a check valve assembly 46. In addition, a check valve ball 60 and check valve spring 58 are located in check valve assembly 46. The check valve spring 58 is positioned between the check valve ball 60 and the check valve retainer 56. The check valve assembly 46, again within which the seat 48 is positioned, is then fixed in place in the sleeve 32 by the tensioner spring 36 and sealed with a gasket 52. In another embodiment, the check valve 45 may be a variable orifice check valve as shown in U.S. Pat. No. 5,259,820 and U.S. Pat. No. 5,277,664, both of which are owned by the assignee of the present application and both of which are incorporated herein by reference.

The check valve 45 performs in the following manner. The outward movement of the piston 34 causes the fluid in the reservoir 22 to force the check valve ball 60 downward, with respect to the check valve retainer 56, to permit fluid flow into the chamber 30. After the chamber 30 fills with fluid, the check valve assembly 46 closes due to the force of fluid against the check valve ball 60 against the seat 48, which presses the ball against the fluid passage.

Reference is now made to FIGS. 6, 7 and 8 to illustrate the operation of the present invention. FIG. 6 illustrates the tensioner at its least extension. Fluid at a higher pressure in the internal reservoir 22 opens the check valve assembly 46, as described above, such that fluid flows into the chamber 30. As the fluid fills the chamber 30, the piston 34 and the tensioner face 40 are moved outward by the force of the pressurized fluid and the spring 36. The piston 34 and tensioner face 40 continue to move outward until the inward force of the chain on the tensioner face 40 and piston 34 balances the outward force of the spring 36 and fluid. FIG. 7 illustrates the tensioner at maximum extension of the piston 34 and face 40. At this point, the check valve ball 60 closes against the seat 48 to prevent further fluid flow into the chamber 30 from the internal reservoir 22.

When the chain slackens due to wear or load fluctuations, the piston 34 and tensioner face 40 are forced outward by the spring 36 and the check valve assembly 46 opens to permit more fluid to flow into the chamber 30 from the internal reservoir 22. Once again, when the inward force of the chain on the tensioner face 40 and piston 34 balances the outward force of the spring 36 and fluid, the check valve assembly 46 closes to prevent further fluid flow into the chamber 30 from the internal reservoir 22. The check valve assembly 46 and seat 48 therefore permit fluid flow into the chamber 30 while preventing fluid backflow into the reservoir 22.

Referring to FIG. 8, the reservoir 22, in addition, has an air bleed outlet 50 which allows air that collects in the reservoir 22 to exit into the atmosphere. Fluid may also exit the air bleed outlet 50 such that the air bleed outlet 50 acts as a lubrication orifice for the belt or chain of the automotive timing system. Fluid exits the air bleed outlet 50 due to fluid pressure in the reservoir 22 during operation of the timing system.

Figure 3:
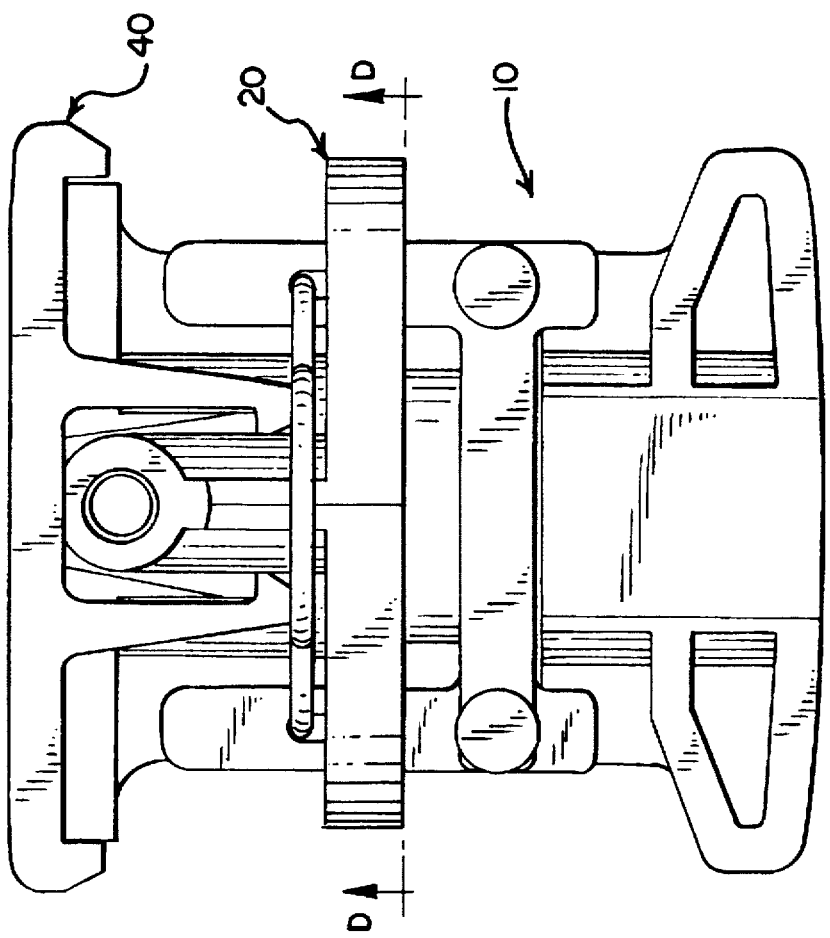
FIG. 3 is a side view of a hydraulic tensioner incorporating the internal reservoir of the present invention.
Figure 9:
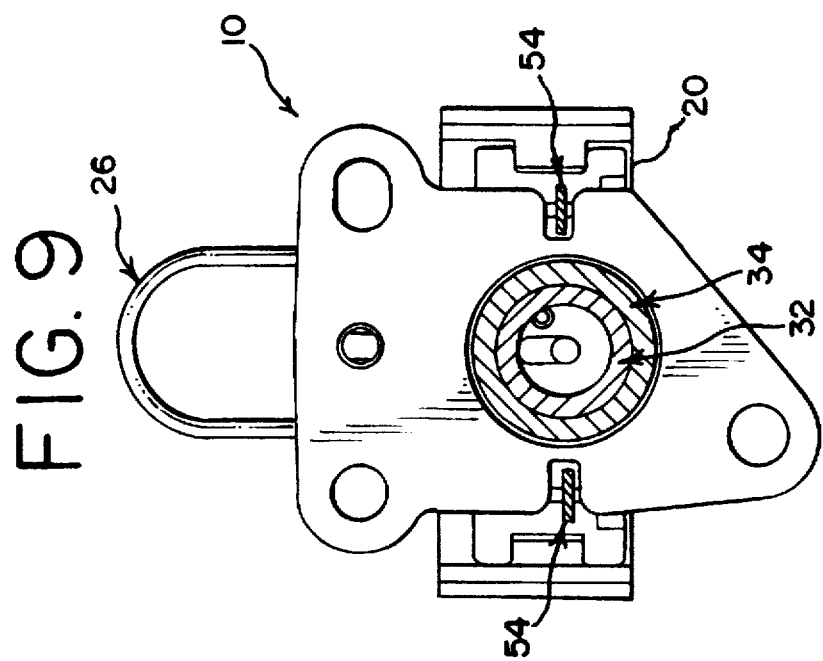
FIG. 9 is a sectional view of a hydraulic tensioner of FIG. 3 along the line IX—IX.

Referring to FIGS. 2, 3, and 9, a retainer 54 and a pin 26 are used to prevent the tensioner 10 from protruding or extending during manufacturing, shipping and assembly. Once the tensioner 10 is installed into an automotive timing system, the pin 26 is removed from the retainer 54 to allow the tensioner 10 to operate as described above. The retainer 54 prevents the tensioner face 40 from rotating during shipping and assembly, and during operation in an automotive timing system.

Those skilled in the art to which the invention pertains may make modifications and other embodiments employing the principles of this invention without departing from its spirit or essential characteristics, particularly upon considering the foregoing teachings. The described embodiments are to be considered in all respects only as illustrative and not restrictive and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. A hydraulic tensioner comprising:
   a housing with a bore formed therein,
   a generally cylindrical sleeve having a first end which is tightly received in said bore of said housing to define an internal reservoir with said bore,
   a hollow piston slidably received about an outside portion of a second end of said sleeve to define a fluid chamber with said sleeve, said piston being spaced apart from said housing in the radial direction,
   a spring biasing said piston in a protruding direction from said housing,
   said internal reservoir adapted to be connected to an external source of pressurized fluid, and said internal reservoir being connected with said fluid chamber, and
   a check valve located between said internal reservoir and said fluid chamber to permit the flow of fluid from said internal reservoir through said check valve into said fluid chamber.

2. The hydraulic tensioner of claim 1 wherein said sleeve is press fit into said bore of said housing.

3. The hydraulic tensioner of claim 1 wherein said sleeve is positioned in said bore of said housing by a threaded screw attachment.

4. The hydraulic tensioner of claim 1 wherein said sleeve is insert molded into said bore of said housing.

5. The hydraulic tensioner of claim 1 wherein said check valve includes a check valve assembly including a valve member and a check valve spring, said valve member biased by said check valve spring against a check valve seat.

6. The hydraulic tensioner of claim 5 wherein said check valve spring is seated against a check valve retainer member and said check valve retainer member is press fit into said sleeve.

7. The hydraulic tensioner of claim 5 wherein said check valve seat is formed integral with said sleeve.

8. The hydraulic tensioner of claim 5 wherein said check valve seat is contained within said check valve assembly, and said check valve assembly is held against a gasket by said spring into said sleeve.

9. The hydraulic tensioner of claim 1 wherein said reservoir includes an air bleed outlet to allow air and fluid to escape from said reservoir.

10. The hydraulic tensioner of claim 1 further comprising a tensioner face, and a pin and a retainer to restrict rotation of said tensioner face during manufacturing and assembly, said pin being inserted into at least two portions of said retainer during assembly and said pin being removed from said retainer after installation in a timing system.

11. A hydraulic tensioner comprising:
    a housing having a cylindrical bore formed therein,
    a generally cylindrical sleeve having an opening at each end of a pair of ends, a first end of said sleeve being tightly assembled in said bore and defining a cylindrical internal reservoir within said first end with said bore, said internal reservoir being connected to an external source of pressurized fluid,
    a hollow piston slidably received about an outside portion of said second end of said sleeve to define a fluid chamber within said second end of said sleeve, said piston being spaced apart from said housing in the radial direction,
    a spring biasing said piston in a protruding direction from said second end of said sleeve,
    a check valve located within said sleeve, said check valve controlling the flow of fluid through a passage in said sleeve to permit fluid flow from said internal reservoir in said first end of said sleeve to said fluid chamber in said second end of said sleeve, and said check valve substantially preventing fluid flow in the reverse direction.

12. The tensioner of claim 11 wherein said check valve includes a check valve assembly surrounded by a check valve seat.

13. The tensioner of claim 11 wherein said internal reservoir is located above said fluid chamber and check valve when said tensioner is positioned in an automotive timing system.

14. The hydraulic tensioner of claim 11 wherein said reservoir includes an air bleed outlet to allow air to escape from said reservoir, and said air bleed outlet allowing fluid to escape from said reservoir to lubricate a chain or belt.

15. The hydraulic tensioner of claim 11 further comprising a tensioner face, and a pin and a retainer to restrict rotation of said tensioner face during manufacturing and assembly, said pin being inserted into at least two portions of said retainer during assembly and said pin being removed from said retainer after installation in a timing system.

16. The hydraulic tensioner of claim 11 wherein said sleeve is positioned in said bore of said housing by a threaded screw attachment.

17. The hydraulic tensioner of claim 11 wherein said sleeve is insert molded into said bore of said housing.

* * * * *